(12) United States Patent
Chen et al.

(10) Patent No.: US 7,106,605 B2
(45) Date of Patent: Sep. 12, 2006

(54) DC CONVERTER CIRCUIT WITH OVERSHOOT PROTECTION

(75) Inventors: Keming Chen, Torrance, CA (US); Lateef A. Kajouke, San Pedro, CA (US); James F. Lazar, Moorpark, CA (US)

(73) Assignee: General Motors Corporation, Detroit, MI (US)

( * ) Notice: Subject to any disclaimer, the term of this patent is extended or adjusted under 35 U.S.C. 154(b) by 148 days.

(21) Appl. No.: 10/881,213

(22) Filed: Jun. 30, 2004

(65) Prior Publication Data

US 2006/0002156 A1    Jan. 5, 2006

(51) Int. Cl.
*H02H 7/125* (2006.01)
(52) U.S. Cl. ......................... 363/52; 363/126
(58) Field of Classification Search .................. 363/52, 363/126, 24, 22
See application file for complete search history.

(56) References Cited

U.S. PATENT DOCUMENTS

| | | | | |
|---|---|---|---|---|
| 3,999,111 A * | 12/1976 | Bailey | .................. | 363/27 |
| 4,860,184 A * | 8/1989 | Tabisz et al. | .................. | 363/17 |
| 5,065,301 A * | 11/1991 | Shioya et al. | .................. | 363/17 |
| 5,422,804 A * | 6/1995 | Clark | .......................... | 363/44 |
| 5,936,857 A * | 8/1999 | Jacobs et al. | ............... | 363/100 |
| 6,483,723 B1 * | 11/2002 | Kuranuki et al. | ............. | 363/17 |

\* cited by examiner

*Primary Examiner*—Shawn Riley
(74) *Attorney, Agent, or Firm*—Christopher DeVries

(57) ABSTRACT

A DC-DC converter comprises an input circuit that stores inductive energy that includes a first switch that releases the stored inductive energy. A transformer includes a primary winding that communicates with the input circuit and a secondary winding. An output circuit communicates with the secondary winding and that includes first and second output conductors and a first diode that communicates with one end of the secondary winding and the first output conductor. A second diode communicates with one end of the secondary winding and the second output conductor. A third diode communicates with an opposite end of the secondary winding and the first output conductor. A fourth diode communicates with an opposite end of the secondary winding and the second output conductor. A first capacitor is connected in parallel to the third diode. A second capacitor is connected in parallel to the fourth diode.

14 Claims, 12 Drawing Sheets

DC CONVERTER CIRCUIT WITH OVERSHOOT PROTECTION

FIELD OF THE INVENTION

The present invention relates to DC/DC converters, and more particularly to DC/DC converters with reduced voltage overshoot.

BACKGROUND OF THE INVENTION

Referring now to FIG. 1, an exemplary DC/DC converter 100 is shown. Voltage source $V_{IN}$ and capacitor $C_{in}$ are connected across conductors 136 and 140. One end of an inductor $L_1$ is connected to the conductor 136 and an opposite end is connected to one end of a primary winding of a transformer $T_1$. One end of an inductor $L_2$ is also connected to the conductor 136 and to the one end of the inductor $L_1$. An opposite end of the inductor $L_2$ is connected to an opposite end of the primary winding of the transformer $T_1$.

A first end of a switch $S_1$ is connected to the opposite end of the inductor $L_1$ and to the first end of the primary winding of the transformer $T_1$. An opposite end of the switch $S_1$ is connected to the conductor 140. A first end of a switch $S_2$ is connected to an opposite end of the inductor $L_2$ and to an opposite end of the primary winding of the transformer $T_1$. An opposite end of the switch $S_2$ is connected to the conductor 140.

A first end of a secondary winding of the transformer $T_1$ (with inductance $L_{LKG}$) is connected to a second terminal of a diode $D_{B1}$ and a first terminal of a diode $D_{B2}$. An opposite end of the secondary winding of the transformer $T_1$ is connected to a second terminal of a diode $D_{B3}$ and a first terminal of a diode $D_{B4}$. A first terminal of the diode $D_{B3}$ and a first terminal of the diode $D_{B3}$ are connected to a conductor 148. A second terminal of the diode $D_{B2}$ and a second terminal of the diode $D_{B4}$ are both connected to a conductor 152. A capacitor $C_{B1}$ is connected across the conductors 148 and 152. $V_{OUT}$ is taken across capacitor $C_{B1}$.

Referring now to FIG. 2, an equivalent circuit 200 for the DC/DC converter circuit of FIG. 1 is shown. A switch $S_A$ is connected to a current source 12. A body capacitance $C_{DS}$ is connected across switch $S_A$. Inductance $L_{LKG}$ is also connected in series with voltage $V_{SP}$ across switch $S_A$ and the body capacitance $C_{DS}$. The circuit leakage inductance, $L_{LKG}$, and the body capacitance $C_{DS}$ of the switch $S_A$ form a resonant circuit. The resonant circuit has a peak voltage that is a function of $I*Z_0 + V_{sp}$, where $Z_0 = (L_{lkg}/C_{DS})^{0.5}$ and $V_{sp}$ is the reflected output voltage of the converter.

Referring back to FIG. 1, initially the switch $S_1$ is conducting and inductive energy is stored in the inductances $L_1$ and $L_2$. The switch $S_1$ is subsequently turned off and a step current with magnitude of I flows into the transformer $T_1$ through the leakage inductance $L_{lkg}$ (and the switch $S_2$). The DC/DC converter 100, as shown in FIG. 1, generates large voltage spikes across the switches $S_1$ and $S_2$ during turn off due to the transformer leakage inductance $L_{LKG}$.

Voltage snubber circuits may be used to limit the voltage spikes across the switching devices. In FIG. 3, a DC/DC converter 300 with a peak clamp snubber circuit is shown. Voltage source $V_{IN}$ is applied across conductors 304 and 308. A first end of an inductor $L_{C1}$ is connected to the conductor 304. An opposite end of the inductor $L_{C1}$ is connected to a first end of a primary winding of a transformer $T_2$. A first end of an inductor $L_{C2}$ is also connected to the input conductor 304 and to the first end of the inductor $L_{C1}$. The opposite end of the inductor $L_{C2}$ is connected to the opposite end of the primary winding of the transformer $T_2$. A first end of a switch $S_{C1}$ is connected to the opposite end of the inductor $L_{C2}$ and to the opposite end of the primary winding of the transformer $T_2$.

The opposite end of the switch $S_{C1}$ is connected to the conductor 308. A first end of a switch $S_{C2}$ is connected to the opposite end of the inductor $L_{C1}$ and to the first end of the primary winding of the transformer $T_2$. The opposite end of the switch $S_{C2}$ is connected to the conductor 308.

The anode of a diode $D_{C1}$ is connected to the first side of the primary winding of the transformer $T_2$ and to one side of the switch $S_{C2}$. The anode of the diode $D_{C2}$ is connected to the opposite side of the primary winding of the transformer $T_2$ and to the first side of the switch $S_{C1}$. The cathode sides of the diodes $D_{C1}$ and $D_{C2}$ are both connected to one end of capacitor $C_{C1}$ and one end of resistor $R_{C1}$. Opposite ends of capacitor $C_{C1}$ and resistor $R_{C1}$ are both connected to input conductor 304.

The first end of the secondary winding of the transformer $T_2$ is connected to the second terminal of a diode $D_{D1}$ and the first terminal of a diode $D_{D2}$. The opposite end of the secondary winding of the transformer $T_2$ is connected to a second terminal of a diode $D_{D3}$ and a first terminal of a diode $D_{D4}$. The first terminals of the diodes $D_{D1}$ and $D_{D3}$ are both connected to a conductor 312. The second terminals of the diodes $D_{D2}$ and $D_{D4}$ are both connected to a conductor 316. A capacitor $C_{D1}$ is connected in parallel across the conductors 312 and 136. Output voltage is provided across conductors 312 and 316.

Waveforms of snubber circuit 300 are shown in FIG. 4. Reference number 402 shows current through switch $S_{C1}$. Reference number 404 shows voltage across inductor $L_{C2}$. Reference number 406 shows voltage across switch $S_{C1}$. FIG. 4 shows that the peak voltage across the switch is limited to a preset value that is controlled by $C_{C1}$. Overshoot voltage is limited by the clamp capacitor voltage of the snubbing circuit 300. Disadvantages of the approach shown in FIGS. 3 and 4 relate to component count, component cost, circuit size and power dissipation.

Referring now to FIG. 5, a DC/DC converter 500 with a snubber circuit is shown. A voltage source $V_{IN}$ is applied across conductors 504 and 508. A first end of an inductor $L_{E1}$ is connected to the conductor 504. The opposite end of the inductor $L_{E1}$ is connected to a first end of a primary winding of a transformer $T_3$. A first end of an inductor $L_{E2}$ is also connected to the conductor 504 and to the first end of the inductor $L_{E1}$. The opposite end of the inductor $L_{E2}$ is connected to the opposite end of the primary winding of the transformer $T_3$. A first end of a switch $S_{E1}$ is connected to the opposite end of the inductor $L_{E1}$ and to the first end of the primary winding of the transformer $T_3$. The opposite end of the switch $S_{E1}$ is connected to the conductor 508. A first end of the switch $S_{E2}$ is connected to the opposite end of the inductor $L_{E2}$ and to the opposite end of the primary winding of the transformer $T_3$. The opposite end of the switch $S_{E2}$ is connected to the conductor 508.

A first end of capacitor $C_{E4}$ is connected to the conductor 504 and the opposite end is connected to the conductor 508. An inductor $L_{E3}$ is connected to the conductor 508 and to the anode end of diode $D_{E5}$. The cathode of diode $D_{E5}$ is connected to one end of a capacitor $C_{E2}$. The other end of the capacitor $C_{E2}$ is connected to the opposite end of an inductor $L_{E1}$, the first end of the primary winding of transformer $T_3$, and the first end of switch $S_{E1}$.

An inductor $L_{E4}$ is connected to conductor 508 and to the anode of a diode $D_{E6}$. The cathode of the diode $D_{E6}$ is connected to one end of a capacitor $C_{E5}$. The other end of the capacitor $C_{E5}$ is connected to the opposite end of an inductor $L_{E2}$, the opposite end of the primary winding of the transformer $T_3$, and the first end of the switch $S_{E2}$. The anode of a diode $D_{E2}$ is connected to the cathode end of diode $D_{E5}$. The anode of a diode $D_{E3}$ is connected to the cathode end of diode $D_{E6}$. The cathode ends of the diodes $D_{E2}$ and $D_{E3}$ are joined to the first end of a capacitor $C_{E4}$.

A first end of a secondary winding of the transformer $T_3$ (with inductance $L_{IKG}$) is connected to the anode of a diode $D_{F1}$ and the cathode of a diode $D_{F2}$. The opposite end of the secondary winding of the transformer $T_3$ is connected to the anode of a diode $D_{F3}$ and the cathode of a diode $D_{F4}$. The cathode of the diode $D_{F1}$ and the cathode of the diode $D_{F3}$ are both connected to the conductor 512. The anode of the diode $D_{F2}$ and the anode of the diode $D_{F4}$ are both connected to a conductor 516. A capacitor $C_{F1}$ is connected across output conductor 512 and output conductor 516.

In FIG. 6, peak voltage characteristics 600 across one of the switches of the snubber circuit 500 are shown. Reference number 602 shows current through the switch $S_{E1}$. Reference number 404 shows voltage across the switch $S_{E1}$. In FIG. 7, voltage overshoot 700 for circuit 500 is shown. Circuit 500 requires a snubber capacitance for carrying large pulse current. Accordingly, disadvantages in circuit 500 also relate to component count, component cost, and circuit size.

SUMMARY OF THE INVENTION

A DC-DC converter according to the present invention comprises an input circuit that stores inductive energy that includes a first switch that releases the stored inductive energy. A transformer includes a primary winding that communicates with the input circuit and a secondary winding. An output circuit communicates with the secondary winding and that includes first and second output conductors and a first diode that communicates with one end of the secondary winding and the first output conductor. A second diode communicates with one end of the secondary winding and the second output conductor. A third diode communicates with an opposite end of the secondary winding and the first output conductor. A fourth diode communicates with an opposite end of the secondary winding and the second output conductor. A first capacitor is connected in parallel to the third diode.

In other features, a second capacitor is connected in parallel to the fourth diode. The first and second capacitors substantially eliminate voltage overshoot. The input circuit includes a first inductor having one end that communicates with a first input conductor and an opposite end that communicates with a first end of the primary winding. A second inductor has one end that communicates with the first input conductor and an opposite end that communicates with an opposite end of the primary winding. The first switch has one output that communicates with the opposite end of the first inductor and another output that communicates with a second input conductor.

The input circuit includes a second switch that has one output that communicates with the opposite end of the second inductor and another output that communicates with the second conductor. An output capacitor has one end that communicates with the first output conductor and an opposite end that communicates with the second output conductor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
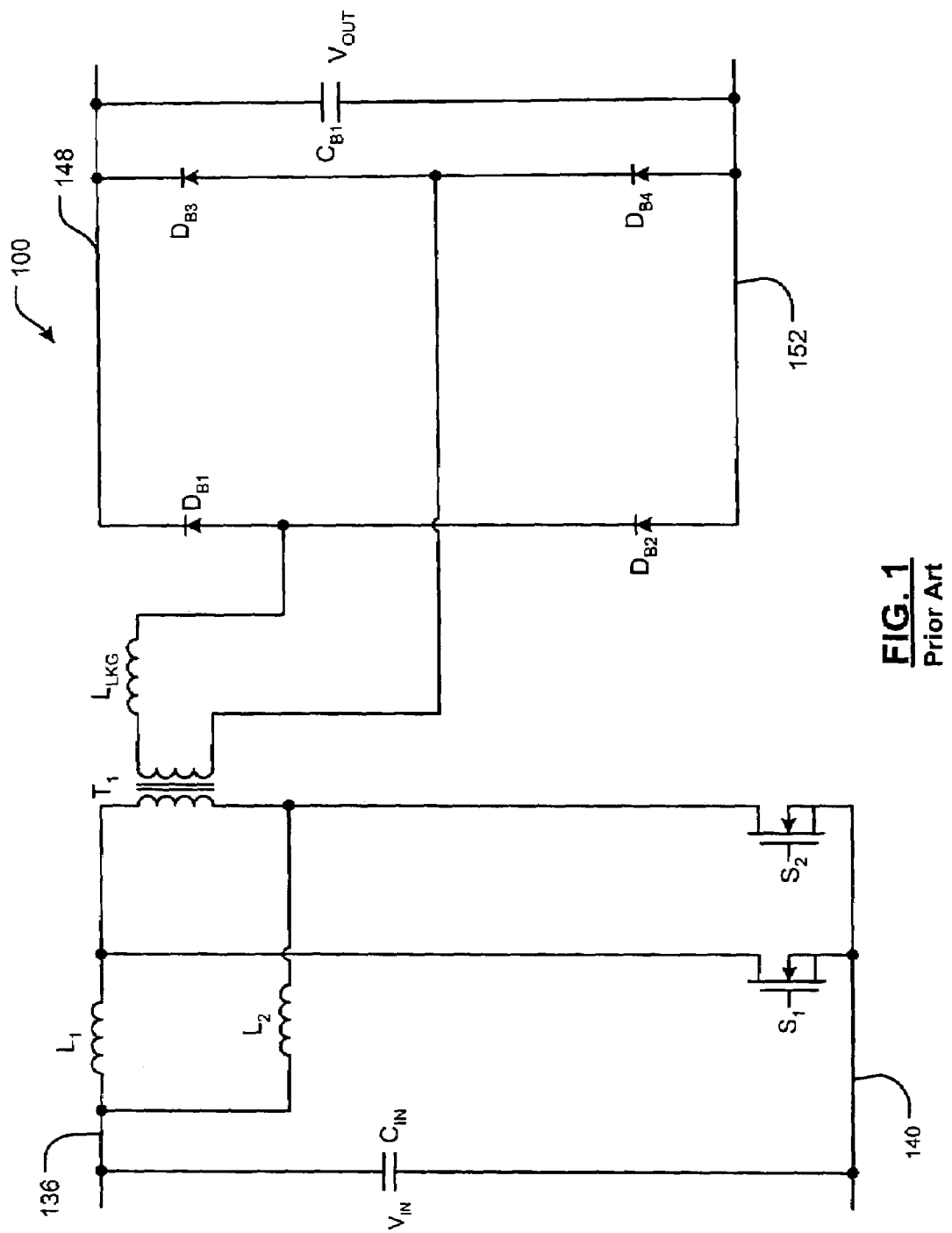
FIG. 1 is a schematic of a DC/DC converter without a snubbing circuit according to the prior art.
Figure 2:
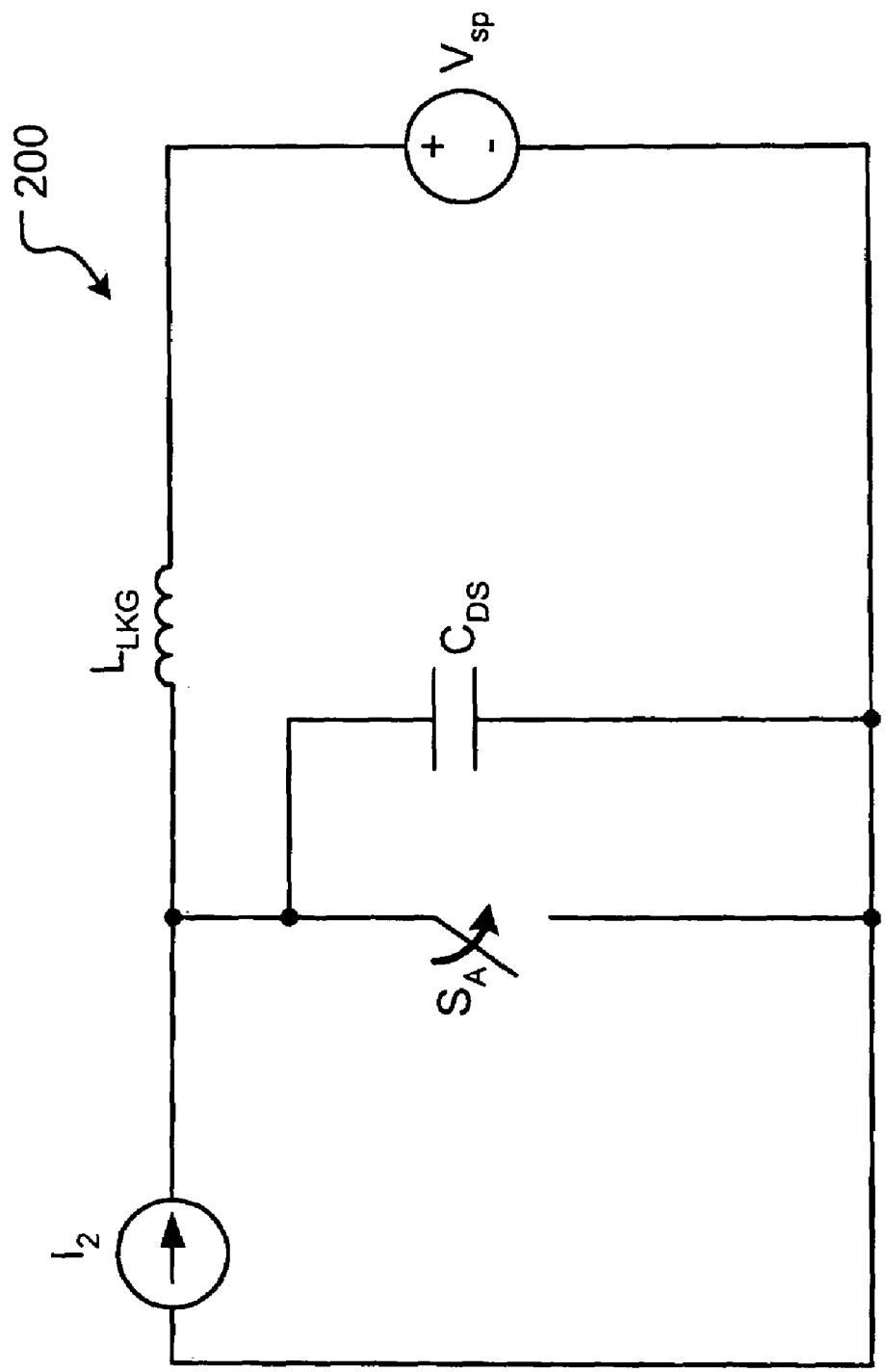
FIG. 2 is a schematic of an equivalent circuit for the prior art DC/DC converter circuit of FIG. 1.
Figure 3:
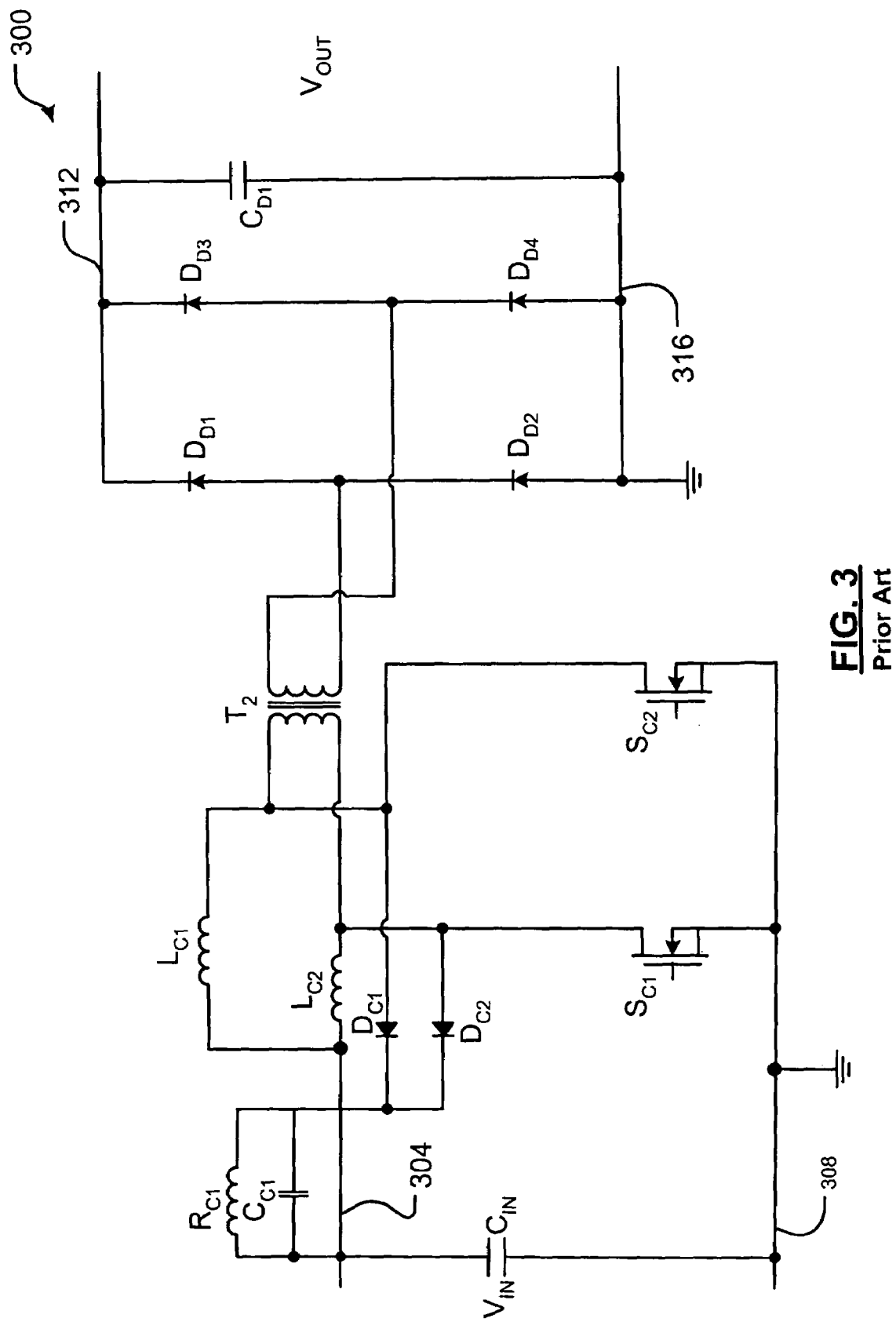
FIG. 3 is a schematic of a peak clamp circuit type voltage snubber circuit according to the prior art.
Figure 4:
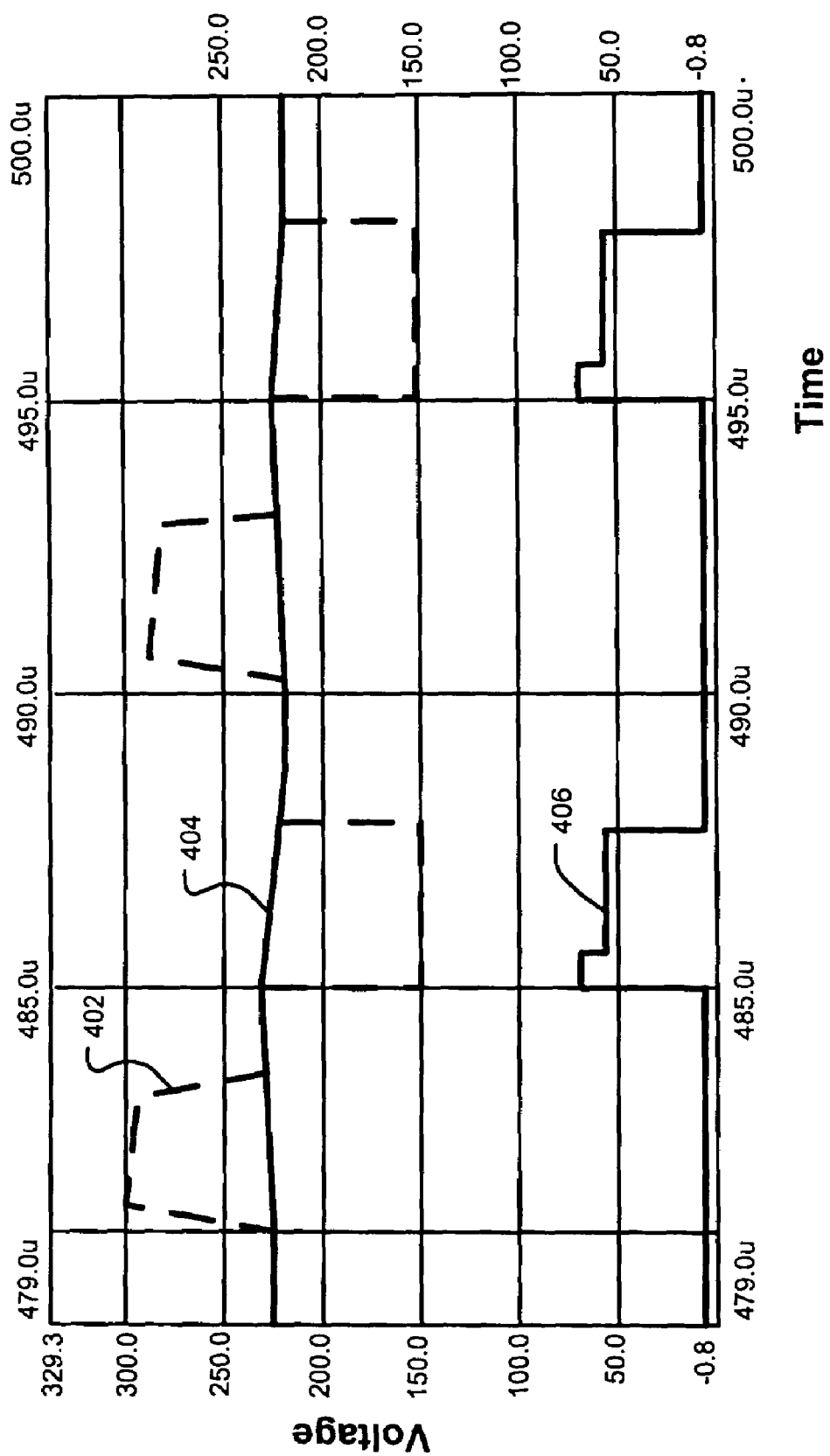
FIG. 4 includes waveforms illustrating peak voltage across a switch in the peak clamp circuit snubber circuit of FIG. 3.
Figure 5:
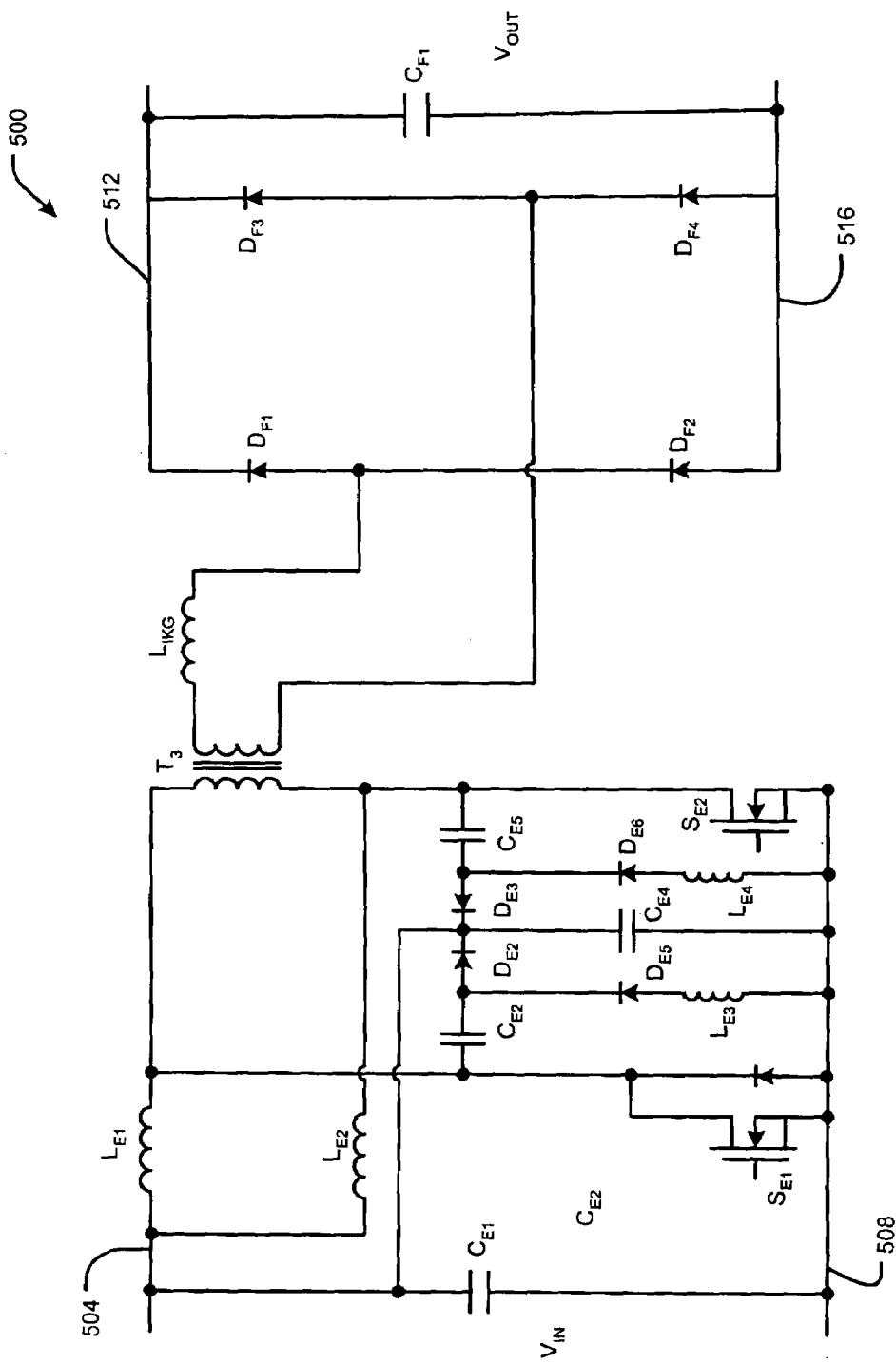
FIG. 5 is a schematic of a non-dissipative snubber circuit according to the prior art.
Figure 6:
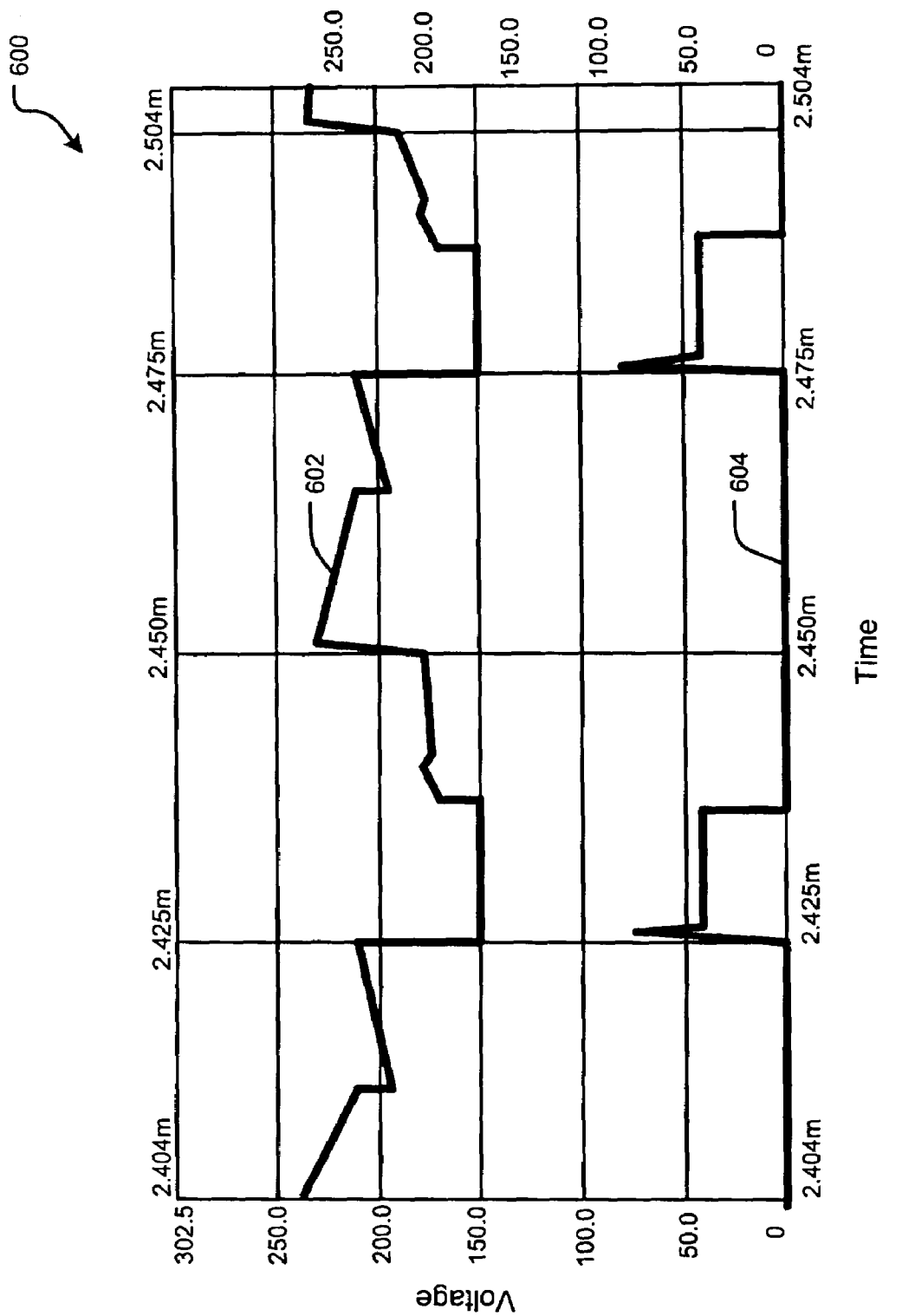
FIG. 6 includes waveforms illustrating peak voltage characteristics of a switch in the non-dissipative snubber circuit of FIG. 5.
Figure 7:
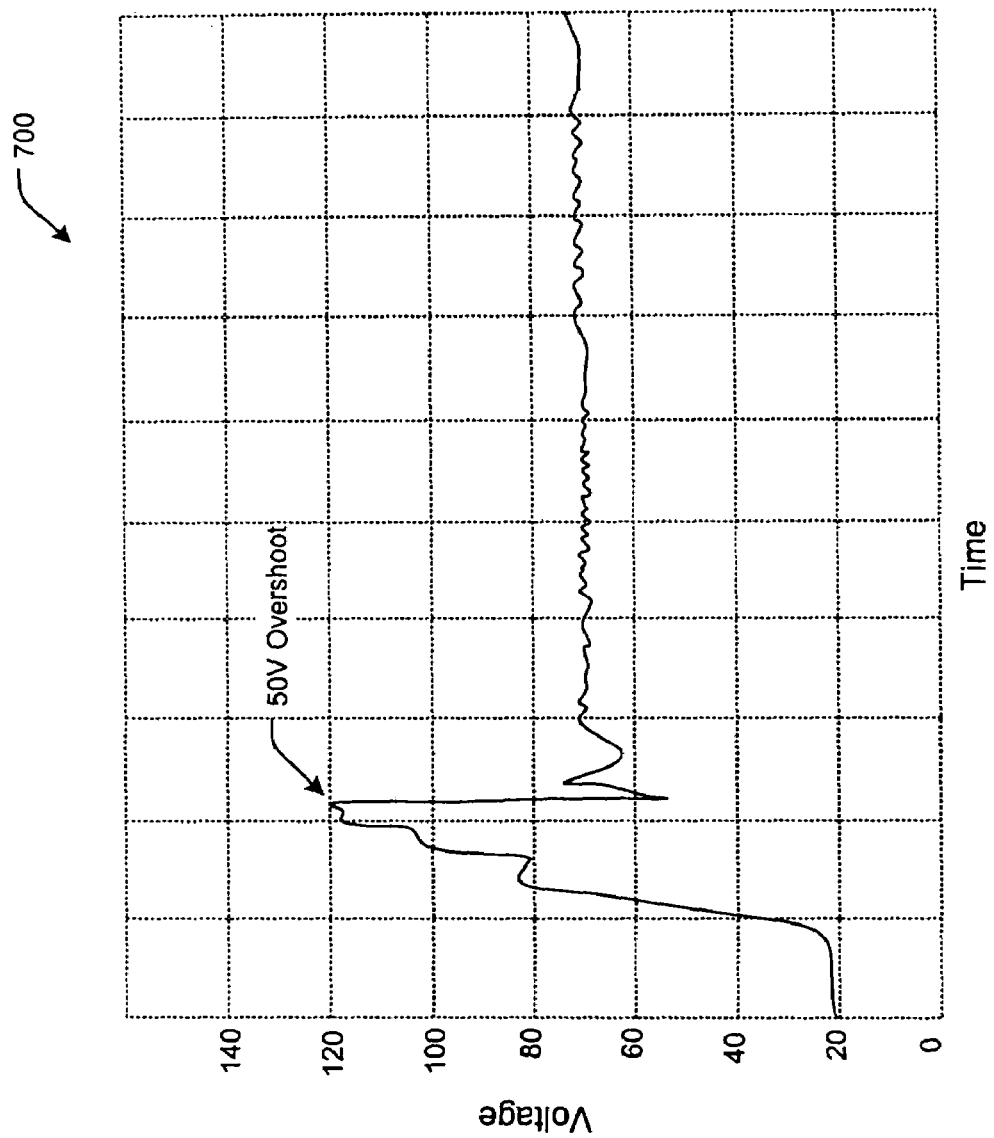
FIG. 7 includes waveforms illustrating voltage overshoot for the non-dissipative snubber circuit of FIG. 5.

The following description of the preferred embodiment is merely exemplary in nature and is in no way intended to limit the invention, its application, or uses. For purposes of clarity, the same reference numbers will be used in the drawings to identify similar elements.

Figure 8:
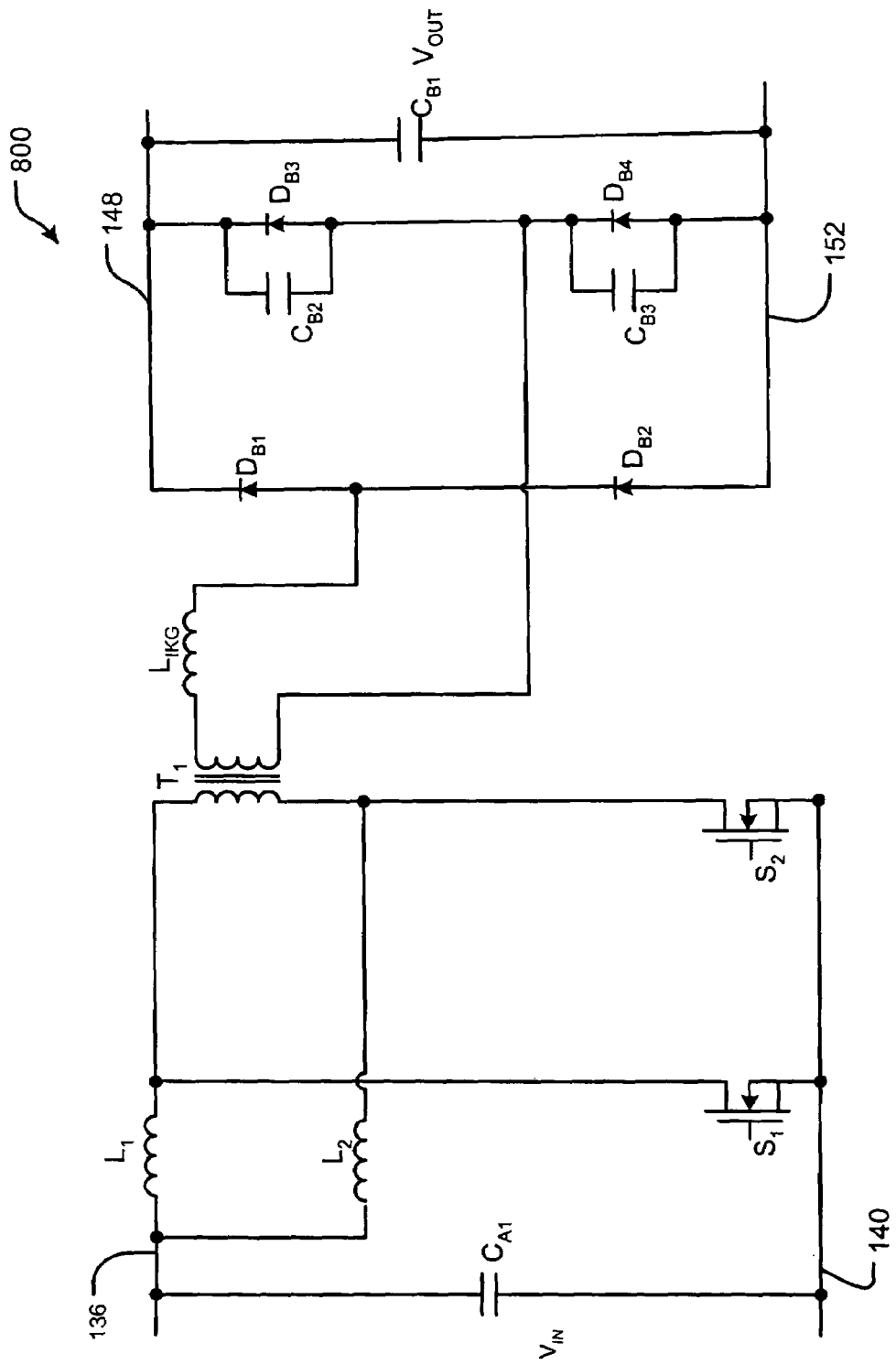
FIG. 8 is a schematic of a snubber circuit according to the present invention for a DC/DC converter circuit.

Turning now to FIG. 8, a DC/DC converter circuit 800 according to the present invention substantially reduces overshoot with fewer additional components than the approaches set forth in FIGS. 1–7. The circuit in FIG. 8 includes circuit elements from the DC/DC converter (without a snubber circuit) shown in FIG. 1. Additional circuit elements include a capacitor $C_{B2}$ connected in parallel across the diode $D_{B3}$. A capacitor $C_{B3}$ is connected in parallel across the diode $D_{B4}$.

The capacitors $C_{B2}$ and $C_{B3}$ provide additional snubber capacitance. In this regard, output capacitors of the semiconductor devices are, in one implementation, used as part of the snubber capacitors. The capacitors $C_{B2}$ and $C_{B3}$ control the rate of change of the isolation transformer voltage when $S_1$ or $S_2$ are turned off.

Figure 9:
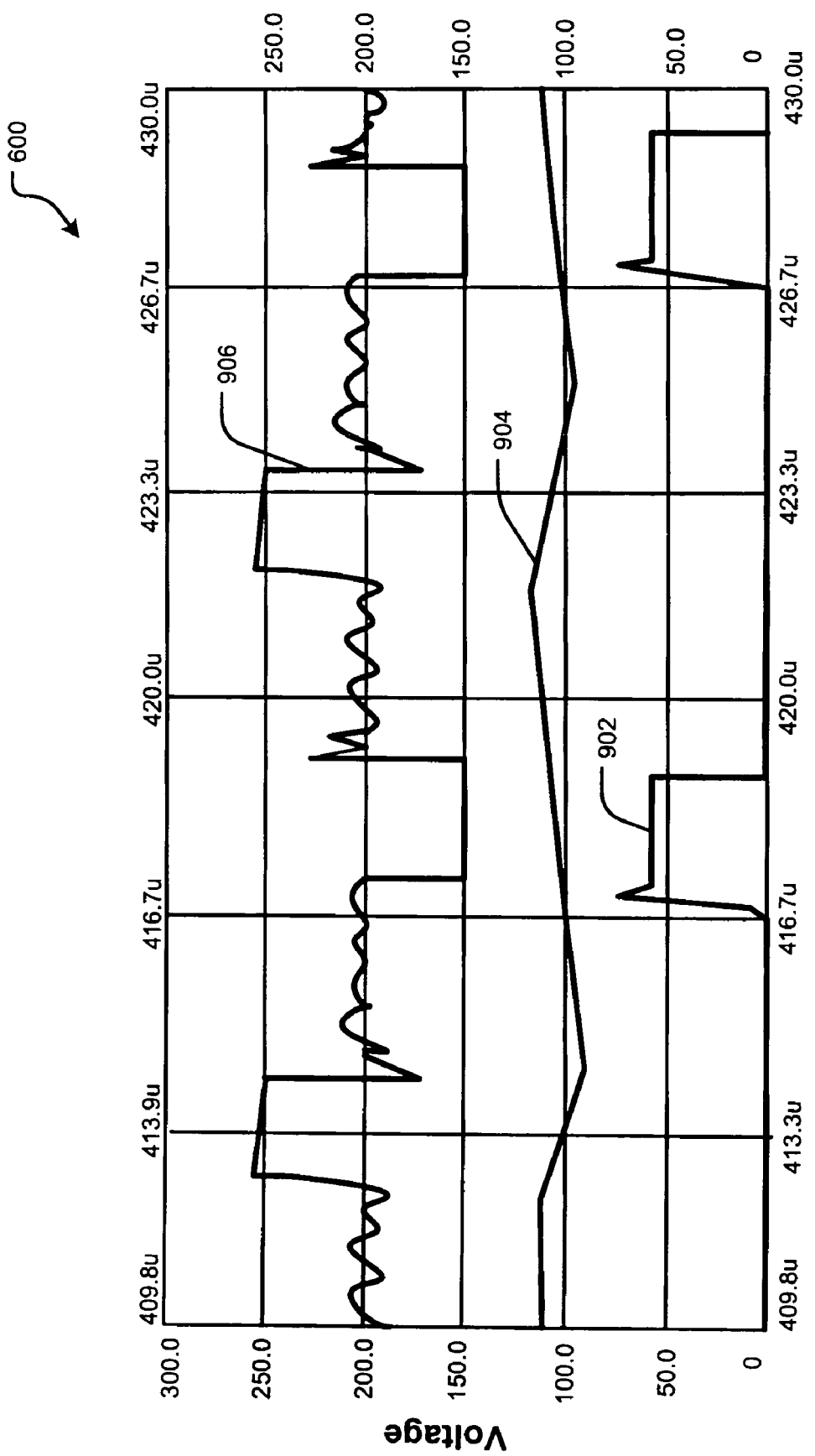
FIG. 9 includes waveforms illustrating current and voltage characteristics across a switch in the DC/DC converter circuit of FIG. 8.

Referring now to FIG. 9, current and voltage characteristics across the switch $S_1$ of the DC/DC converter circuit 800 of FIG. 8 are shown. Reference number 906 shows current through the switch $S_1$. Reference number 904 shows voltage across the inductor $L_1$. Reference number 902 shows voltage across the switch $S_1$. In comparison with similar characteristics shown in FIGS. 4 and 6, the DC/DC converter 800 provides improved performance to the DC/DC converters 300 and 500, with reduced component count, power loss, circuit size, and cost. Furthermore, by controlling turn-off speed of the switches $S_1$ and $S_2$, voltage overshoot can be eliminated.

Figure 10:
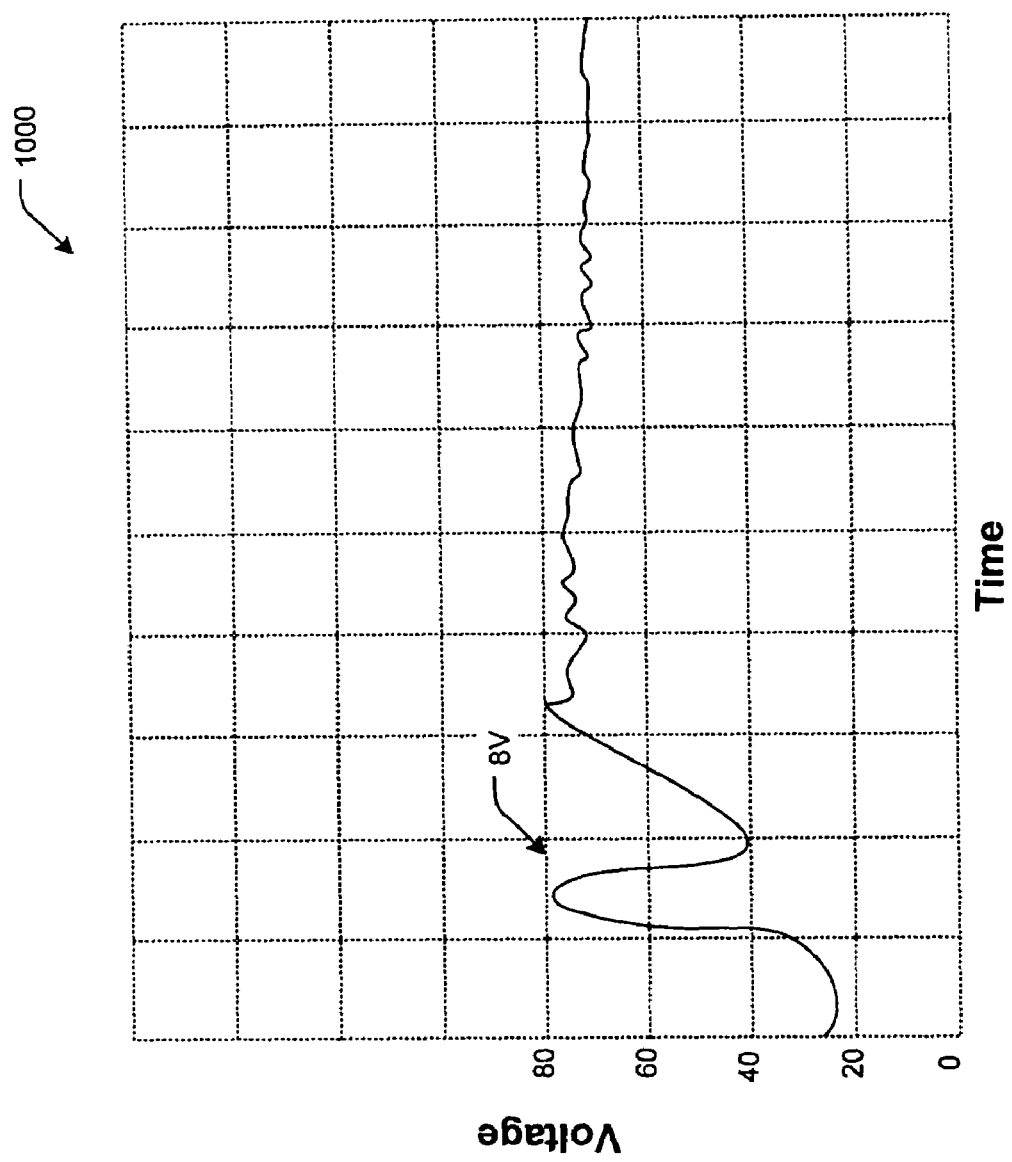
FIG. 10 includes waveforms illustrating voltage overshoot for the DC/DC converter circuit of FIG. 8.
Figure 11A:
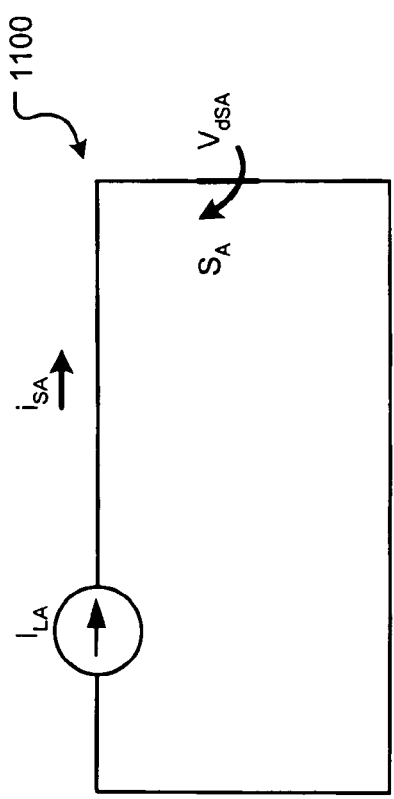
FIGS. 11A and 11B are schematics of two equivalent circuits in open and closed switch states for the DC/DC converter circuit of FIG. 8.
Figure 11B:
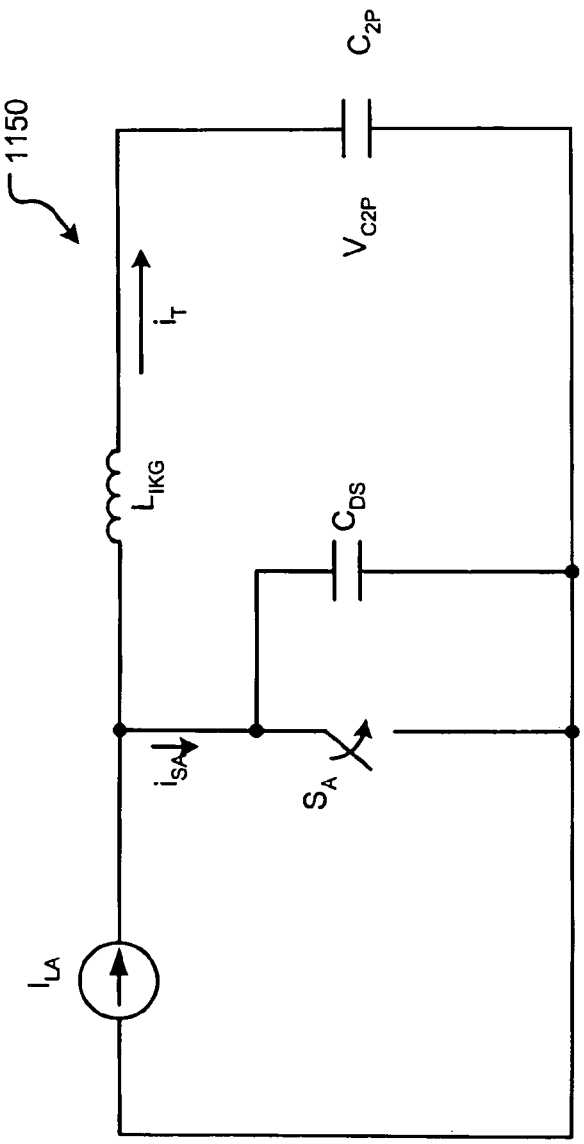
Figure 12:
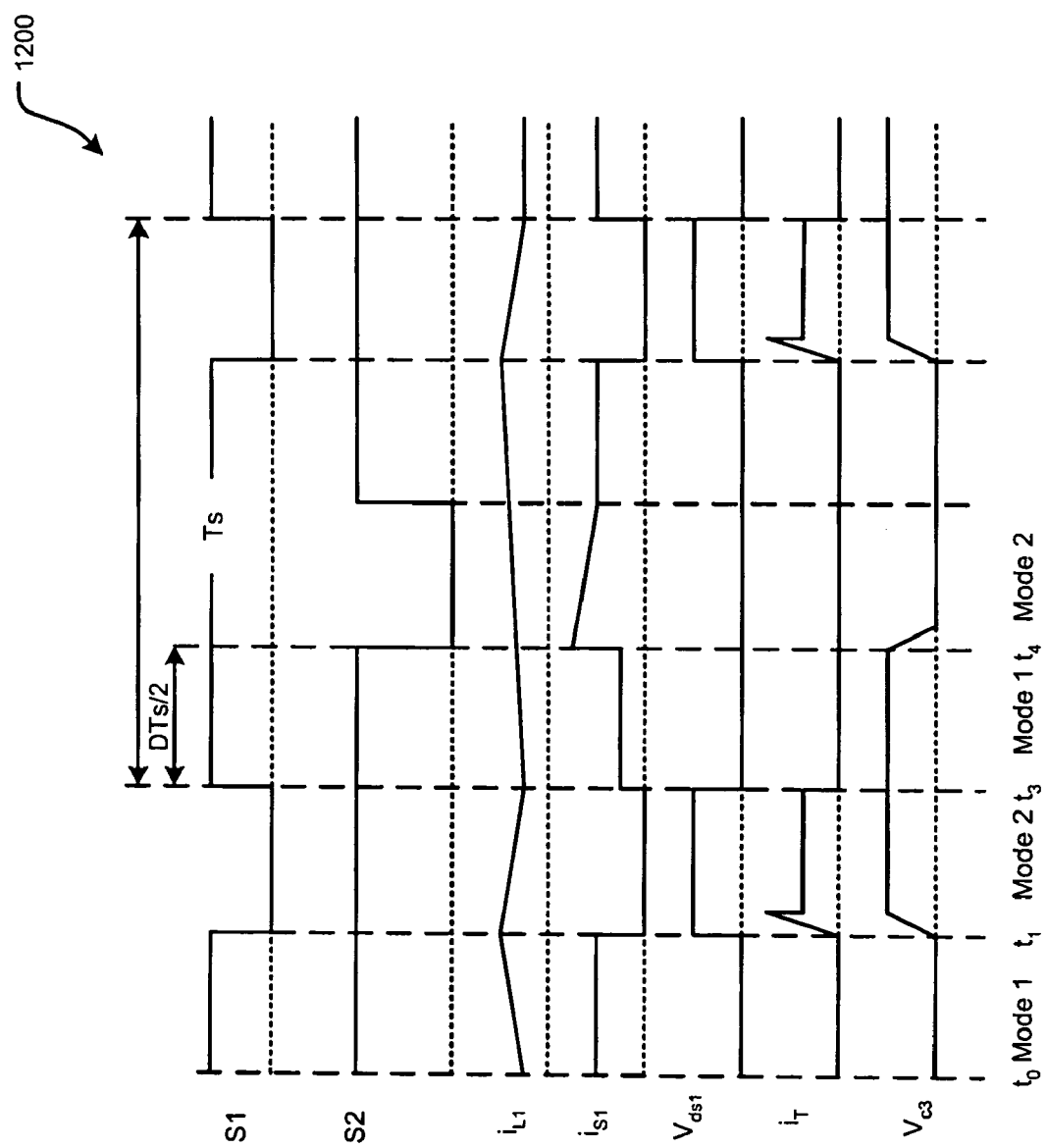
FIG. 12 includes waveforms illustrating component response data for step changes applied to the equivalent circuits of FIGS. 11A and 11B for the DC/DC converter circuit of FIG. 8.

Referring now to FIG. 10, voltage overshoot 1000 for the DC/DC converter circuit 800 of FIG. 8 is shown. FIGS. 11A and 11B show equivalent circuits 1100, 1150 in closed and open switch states for the DC/DC converter circuit 800 of FIG. 8. FIG. 12 presents detailed switching waveform for the equivalent circuits of FIGS. 11A and 11B for the DC/DC converter circuit of FIG. 8.

With reference to FIGS. 11A, 11B, and 12, at $t_1$ the step current is applied across $C_{DS}$. $L_{LKG}$ and the voltage across $S_1$ (or $S_2$) is governed by $I \times Z_o$, and current circulates between $L_{LKG}$ and $C_{DS}$ of $S_1$ (or $S_2$). Initially, voltage across $S_1$ (or $S_2$) builds sinusoidually with a peak of $I \times Z_o$. $C_{B2}$ and $C_{B3}$ control build-up of the voltage at a rate=$I/C_{2p}$, where $C_{2p}$ is the reflected value of $C_{B2}$ and $C_{B3}$ to the primary side of the isolation transformer $T_1$. Finally the voltage across $S_1$ (or $S_2$) reaches $V_{sp}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A DC-DC converter comprising:
   an input circuit that stores inductive energy and that includes a maximum of two switches configured to alternately release at least some of said stored inductive energy;
   a transformer including a primary winding that communicates with said input circuit and a secondary winding; and
   an output circuit that communicates with said secondary winding and that includes:
     first and second output conductors;
     a first diode that communicates with one end of said secondary winding and said first output conductor;
     a second diode that communicates with said one end of said secondary winding and said second output conductor;
     a third diode that communicates with an opposite end of said secondary winding and said first output conductor;
     a fourth diode that communicates with said opposite end of said secondary winding and said second output conductor;
     a first capacitor connected in parallel to said third diode; and
     a second capacitor connected in parallel to said fourth diode;
   wherein said switches and capacitors control a rate of buildup of voltage across at least one of said switches upon a release of at least some of said stored inductive energy when one of said switches is switched off.

2. The DC-DC converter of claim 1 wherein a first of said switches allows at least some of said inductive energy to be stored in the input circuit during part of an "on" period of a second of said switches, until said first switch is switched off in a subsequent "on" period of said second switch.

3. The DC-DC converter of claim 1 wherein an "on" period of a first of said switches overlaps portions of two successive "on" periods of a second of said switches.

4. The DC-DC converter of claim 1 wherein said input circuit includes:
   a first inductor having one end that communicates with a first input conductor and an opposite end that communicates with a first end of said primary winding; and
   a second inductor having one end that communicates with said first input conductor and an opposite end that communicates with an opposite end of said primary winding, wherein a first of said switches has one output that communicates with said opposite end of said first inductor and another output that communicates with a second input conductor.

5. The DC-DC converter of claim 4 wherein a second of said switches has one output that communicates with said opposite end of said second inductor and another output that communicates with said second conductor.

6. The DC-DC converter of claim 1 further comprising an output capacitor that has one end that communicates with said first output conductor and an opposite end that communicates with said second output conductor.

7. A DC-DC converter comprising:
   an input circuit that stores inductive energy and has switches consisting of a first switch that releases at least some of said stored inductive energy during an "off" period of said first switch, and a second switch that allows at least some of said inductive energy to be stored during a period beginning before and ending after the "off" period of the first switch;
   a transformer including a primary winding that communicates with said input circuit and a secondary winding; and
   an output circuit communicates with said secondary winding and that includes:
     first and second output conductors;
     a first diode that communicates with one end of said secondary winding and said first output conductor;
     a second diode that communicates with one end of said secondary winding and said second output conductor;
     a third diode that communicates with an opposite end of said secondary winding and said first output conductor;
     a fourth diode that communicates with an opposite end of said secondary winding and said second output conductor;
     a first capacitor connected in parallel to said fourth diode; and
     a second capacitor connected in parallel said third diode;
   wherein, when said first switch releases at some of said stored inductive energy, at least one of said first and second capacitors controls build-up of voltage across said first switch.

8. The DC-DC converter of claim 7 wherein said input circuit includes:
   a first inductor having one end that communicates with a first input conductor and an opposite end that communicates with a first end of said primary winding; and
   a second inductor having one end that communicates with said first input conductor and an opposite end that communicates with an opposite end of said primary winding, wherein said first switch has one output that communicates with said opposite end of said first inductor and another output that communicates with a second input conductor;

wherein said inductive energy is stored in and released from said first and second inductors.

9. The DC-DC converter of claim 8 wherein said second switch has one output that communicates with said opposite end of said second inductor and another output that communicates with said second conductor.

10. The DC-DC converter of claim 7 further comprising an output capacitor that has one end that communicates with said first output conductor and an opposite end that communicates with said second output conductor.

11. The DC-DC converter of claim 7 wherein turn-off speeds of said first and second switches are controlled to eliminate voltage overshoot.

12. The DC-DC converter of claim 1 wherein turn-off speeds of said first and second switches are controlled to eliminate voltage overshoot.

13. A DC-DC converter including an input circuit, a transformer, and an output circuit, the input circuit comprising:
    a pair of inductors, each having a first end connected with the other inductor and a first input conductor, a primary winding of said transformer connected between second ends of the inductors; and
    a pair of switches, each connected between a second input conductor and the second end of a corresponding one of the inductors;

the output circuit comprising:
    first and second diodes connected with each other and between first and second output conductors, a first end of a secondary winding of the transformer connected between the first and second diodes, the first diode having an anode connected with a cathode of the second diode and a cathode connected with the first output conductor;
    third and fourth diodes connected with each other and between the output conductors, a second end of the secondary winding connected between the third and fourth diodes, the third diode having an anode connected with a cathode of the fourth diode and a cathode connected with the first output conductor; and
    first and second capacitors, each connected in parallel with a corresponding one of the third and fourth diodes;
wherein the switches and capacitors are configured to control a rate of buildup of voltage across at least one of the switches upon a release of energy from the inductors when one of the switches is switched off.

14. The converter of claim 13 wherein the switches have overlapping "on" states.

* * * * *